(12) United States Patent
Kwak et al.

(10) Patent No.: US 8,929,842 B2
(45) Date of Patent: Jan. 6, 2015

(54) APPARATUS AND METHOD FOR BODY PROTECTION FROM ELECTROMAGNETIC FIELDS

(75) Inventors: Sang il Kwak, Daejeon (KR); Jong Hwa Kwon, Daejeon (KR); Dong-Uk Sim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 181 days.

(21) Appl. No.: 13/603,608

(22) Filed: Sep. 5, 2012

(65) Prior Publication Data

US 2013/0059550 A1    Mar. 7, 2013

(30) Foreign Application Priority Data

Sep. 5, 2011  (KR) .......................... 10-2011-0089763

(51) Int. Cl.
*H03C 1/52* (2006.01)
*H04B 1/38* (2006.01)
*H04B 1/04* (2006.01)

(52) U.S. Cl.
CPC .................................... *H04B 1/3838* (2013.01)
USPC .......................................... 455/106; 455/107

(58) Field of Classification Search
USPC .................................................. 455/106–107
See application file for complete search history.

(56) References Cited

U.S. PATENT DOCUMENTS

| | | | |
|---|---|---|---|
| 6,657,595 B1 * | 12/2003 | Phillips et al. ................ | 343/702 |
| 6,897,831 B2 | 5/2005 | McKinzie, III et al. | |
| 7,420,524 B2 | 9/2008 | Werner et al. | |
| 2003/0112186 A1 * | 6/2003 | Sanchez et al. ........ | 343/700 MS |
| 2004/0214621 A1 * | 10/2004 | Ponce De Leon et al. . | 455/575.8 |

OTHER PUBLICATIONS

Daniel F. Sievenpiper et al., "Two-Dimensional Beam Steering Using an Electrically Tunable Impedance Surface", IEEE Transactions on Antennas and Propagation, Oct. 2003, vol. 51, No. 10.

* cited by examiner

*Primary Examiner* — Lee Nguyen
(74) *Attorney, Agent, or Firm* — William Park & Associates Patent Ltd.

(57) ABSTRACT

An apparatus for use in a communication device with an antenna protects a body from electromagnetic fields. The apparatus includes a sensing unit to sense a surrounding environment of the communication device, a variable element to perform a variable operation according to a voltage or current applied thereto. The apparatus further includes a variable element control unit to control the voltage or current according to the surrounding environment sensed by the sensing unit to cause the variable element to perform the variable operation, and an intelligent periodic structure coupled with the variable element, the intelligent periodic structure being configured to change an operation frequency of the wireless communication device according to the variable operation of the variable element and adjust a radiation pattern direction of the antenna.

14 Claims, 3 Drawing Sheets

APPARATUS AND METHOD FOR BODY PROTECTION FROM ELECTROMAGNETIC FIELDS

CROSS-REFERENCE TO RELATED APPLICATIONS

The present invention claims priority of Korean Patent Application No. 10-2011-0089763, filed on Sep. 5, 2011 which is incorporated herein by reference.

FIELD OF THE INVENTION

The present invention relates to an apparatus and method for body protection from electromagnetic fields, and more particularly, to an apparatus and method for body protection from electromagnetic fields, which is capable of not only protecting a body from electromagnetic fields according to the surrounding environment, but also improving the performance of an antenna.

BACKGROUND OF THE INVENTION

Recently, the use of communication devices such as mobile communication devices has increased. Typically, such communication devices are used close to the body. As the use of communication devices explosively increases, much attention has been paid to an effect of electromagnetic fields generated from the communication devices on the body.

According to current researches, a connection of the effect of electromagnetic fields on the body at frequency bands used by the communication devices has not been clearly revealed. However, it is likely that the electromagnetic fields have an effect on various diseases such as leukemia and brain tumor. Therefore, electromagnetic field reduction technologies for preparation for exposure to electromagnetic fields which may be harmful will become necessary technology in the future.

Existing technologies for the electromagnetic field reduction generally employ an electromagnetic field absorber or apply the modification of a radiator structure such as antenna mismatch. Furthermore, a technology using an artificial magnetic conductor (AMC) and an electromagnetic bandgap (EBG) is applied as one of electromagnetic field radiation control technologies. In this technology, periodic metal patterns are artificially implemented in a substrate formed of dielectric or the like, in order to change the electromagnetic characteristics of a radiator.

The AMC technology may reduce the size of an antenna, and increase the gain of the antenna, thereby improving the radiation characteristics of the radiator.

Such a technology may be used to control a radiation pattern of electromagnetic fields radiated from the radiator and reduce the radiation of the electromagnetic fields toward the body, thereby protecting the body.

Since the above-described AMC technology uses a passive element, the direction of electromagnetic fields may be adjusted only in one direction at a designed frequency with limitation. Therefore, when the surrounding environment is changed, the AMC technology may not actively deal with the change.

SUMMARY OF THE INVENTION

In view of the above the present invention provides an apparatus and method for body protection from electromagnetic fields, which is capable of operating a variable element according to the surrounding environment and adjusting a radiation pattern of an antenna by changing an operation frequency of a periodic structure, thereby minimizing radiation of electromagnetic fields to the body.

In accordance with a first aspect of the present invention there is provided an apparatus for body protection from electromagnetic fields for use in a wireless communication terminal with an antenna, the apparatus including: a sensing unit configured to sense a surrounding environment of the wireless communication terminal; a variable element configured to perform a variable operation according to a voltage or current applied thereto; a variable element control unit configured to control the voltage or current according to the surrounding environment sensed by the sensing unit to cause the variable element to perform the variable operation; and an intelligent periodic structure coupled with the variable element, wherein the intelligent periodic structure is configured to change an operation frequency of the wireless communication terminal according to the variable operation of the variable element and adjust a radiation pattern direction of the antenna.

In accordance with a second aspect of the present invention there is provided a method for body protection from electromagnetic fields in a wireless communication terminal including a variable element performing a variable operation according to a voltage or current applied thereto and an intelligent periodic structure combined with the variable element, the method including: sensing a surrounding environment of the wireless communication terminal; controlling the variable element to perform the variable operation by controlling the voltage or current according to the sensed surrounding environment; changing the operation frequency through the use of the intelligent periodic structure according to the variable operation; and adjusting the radiation pattern direction of the antenna.

In accordance with the embodiments of the present invention, as the frequency-selective periodic structure is applied to a communication device, the body protection apparatus may control the radiation pattern according to the surrounding environment to reduce an absorption rate of electromagnetic fields which may be absorbed into the body, in the communication band. Furthermore, the body protection apparatus may improve the performance of the antenna using the periodic structure in a different service band such as WLAN. Therefore, the body protection apparatus may intelligently deal with the surrounding environment.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, an apparatus and method for body protection from electromagnetic fields, which is capable of not only changing an operation frequency by changing capacitance or inductance inside a periodic structure according to a variable element, but also protecting a body from electromagnetic fields by controlling a radiation pattern of an antenna, will be described in detail with reference to the accompanying drawings.

Figure 1:
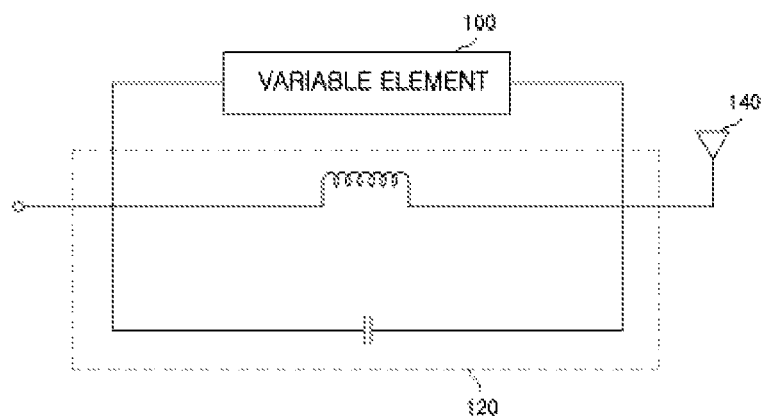
FIG. 1 is a circuit diagram illustrating an apparatus for body protection from electromagnetic fields in accordance with an embodiment of the present invention.

FIG. 1 is a circuit diagram illustrating an apparatus for body protection from electromagnetic fields in accordance with an embodiment of the present invention. The apparatus of the embodiment may include a radiation structure including a variable element 100 and an intelligent periodic structure 120 that are connected to an antenna 140. The variable element 100 performs a variable operation according to a voltage and/or current applied thereto, or mechanical manipulation thereof. The intelligent periodic structure 120 is configured to change an operation frequency thereof according to the variable operation of the variable element 100.

The variable element 100 changes the operation frequency of the intelligent periodic structure 120 by controlling capacitance or inductance induced in the intelligent periodic structure 120 according to a voltage or current applied thereto and/or a mechanical manipulation thereof. Examples of the variable element 100 may include a varactor, a tunable inductor and the like.

The variable element 100 may be positioned between unit cells of the intelligent periodic structure 120 and inside the intelligent period structure 120, and connected to the ground surface.

Meanwhile, an operation frequency band to be served by the body protection apparatus of the embodiment may differ depending on a service band, and the value and structure of the variable element 100 may be changed according to each frequency to be designed, in order to change the operation frequency band.

Figure 2:
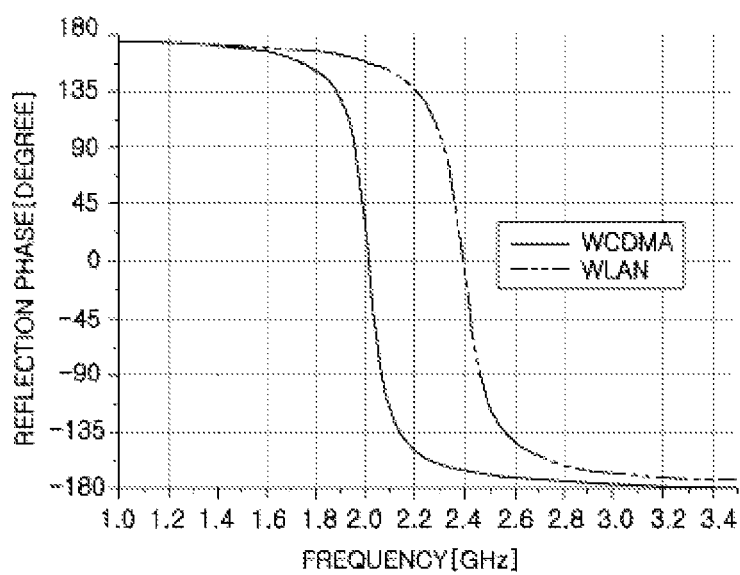
FIG. 2 illustrates an example to which the embodiment of the present invention is applied.

The intelligent periodic structure 120 may include a capacitor and/or inductor, and the operation frequency thereof may be changed depending on the change in the capacitance and/or inductance. For example, referring to FIG. 2, the intelligent periodic structure 120 may be operated at an operation frequency in a wideband code division multiple access (WCDAM) band, and the operation frequency may be changed to an operation frequency in a wireless local area network (WLAN) band according to the variable operation of the variable element 100. When the operation frequency band of the intelligent periodic structure 120 is changed with the variable operation of the variable element 100, a radiation pattern of the antenna 140 is controlled in the opposite direction to the body. The radiation to the body may then be reduced to thereby protect the body from electromagnetic fields.

An example in which the apparatus having the configuration illustrated in FIG. 1 is applied to a wireless communication terminal will be described with reference to FIG. 3.

Figure 3:
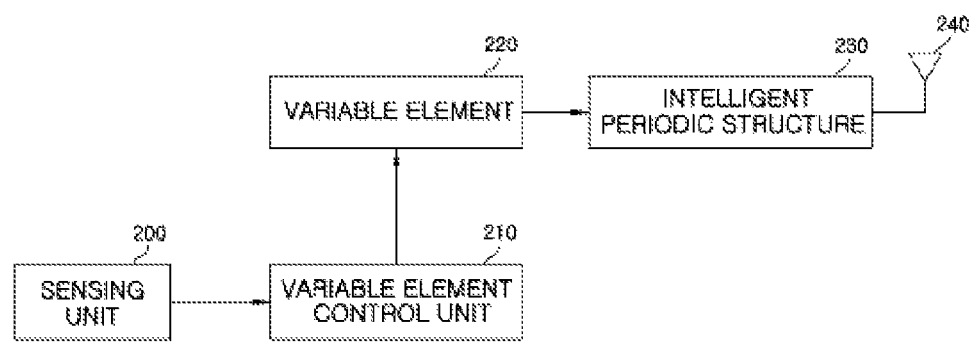
FIG. 3 is a block diagram illustrating an apparatus for body protection from electromagnetic fields for use in a wireless communication device in accordance with an embodiment of the present invention.

FIG. 3 is a block diagram illustrating an apparatus for body protection for use in a wireless communication terminal in accordance with an embodiment of the present invention. The body protection apparatus may include a sensing unit 200, a variable element control unit 210, a variable element 220, and an intelligent periodic structure 230. The wireless communication terminal may include an antenna 240.

The apparatus for use in the wireless communication terminal may operate the variable element 220 according to the surrounding environment of the wireless communication terminal. Accordingly, the body protection apparatus not only may change the operation frequency band of the intelligent periodic structure 230, but also control a radiation pattern of the antenna 240 using the intelligent periodic structure 230, thereby reducing radiation of electromagnetic fields to the body.

The sensing unit 200 may sense the surrounding environment of the wireless communication terminal. For example, the sensing unit 200 may sense whether or not a call button on the wireless communication terminal is manipulated, whether or not the wireless Internet is used in the wireless communication terminal, whether or not a video call is performed in the wireless communication terminal, or whether or not the wireless communication terminal communicates with an external near-field communication device. The sensing result of the sensing unit 200 may be provided to the variable element control unit 210.

The variable element control unit 210 may control the variable operation of the variable element 220 based on the sensing result of the sensing unit 200. That is, the variable element control unit 210 may control a current and/or voltage supplied to the variable element 220, so that the variable element 220 may perform the variable operation.

The capacitance or inductance induced in the intelligent periodic structure 230 is controlled according to the variable operation of the variable element 220 and, therefore, the operation frequency band of the wireless communication terminal may be changed.

Meanwhile, the intelligent periodic structure 230 not only may change the operation frequency band, but also control the radiation pattern direction of the antenna 240. That is, the intelligent periodic structure 230 may control the radiation pattern of the antenna 240 in the opposite direction to the body, thereby reducing the radiation of electromagnetic fields having an effect on the body.

Following is a description on a case in which the body protection apparatus is applied to a wireless communication terminal operating in a first communication band, for example, a WCDMA communication band and a second communication band, for example, a WLAN band.

First, the sensing unit 200 senses whether or not a call button is manipulated on the wireless communication terminal, and provides the sensing result to the variable element control unit 210 when the call button is manipulated. The variable element control unit 210 triggers the operation of the variable element 220 upon sensing the manipulation of the call button.

The operation of the variable element 220 causes the intelligent periodic structure 230 to change the operation frequency band to the first communication band by controlling the capacitance or inductance, and adjust the radiation pattern direction of the antenna 240.

Meanwhile, when the sensing unit 200 senses that the call is completed, the variable element control unit 210 operates the variable element 220 to control the capacitance or inductance of the intelligent periodic structure 230. Then, the variable element control unit 210 changes the operation frequency of the wireless communication terminal to the second communication band from the first communication band, and improves the performance of the antenna 240 served in the WLAN communication band serving as the second communication band.

Meanwhile, when the operation frequency band is changed to the first communication band while a call is performed using near-field communication device such as Bluetooth device, the radiation pattern direction of the antenna 240 may be adjusted toward the body to thereby increase the radiation of electromagnetic fields having an effect on the body. In order to cope with the situation, the sensing unit 200 also senses whether or not the wireless communication terminal is in contact with the body and whether or not the call button is manipulated. That is, when the call button is manipulated in a state where the body, e.g. a face of a user, touches the wireless communication terminal, that is, when the user makes a call using the near-field communication device, the sensing unit 200 senses this condition. In response to the sensing result, the variable element control unit 210 controls the variable element 220 not to perform its variable operation. Accordingly, the intelligent periodic structure 230 neither changes the operation frequency, nor controls the electromagnetic radiation pattern toward the body. Therefore, it is possible to prevent the increase in the radiation of electromagnetic fields toward the body.

Figure 4:
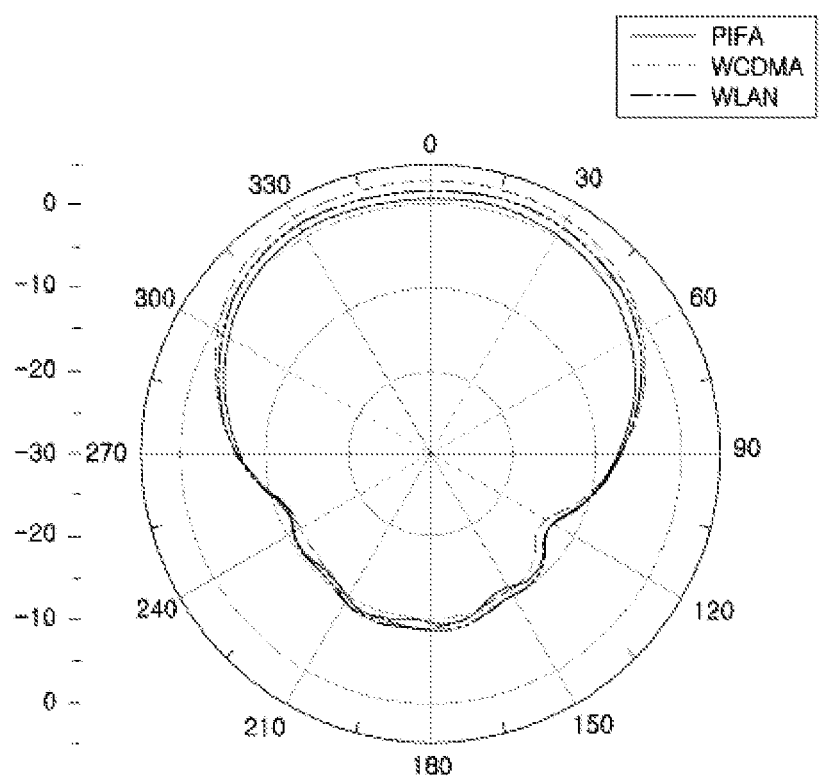
FIG. 4 is a diagram explaining an antenna radiation pattern for each condition in a wideband code division multiple access (WCDAM) band in the apparatus for body protection from electromagnetic fields in accordance with the embodiment of the present invention.

FIG. 4 illustrates an antenna radiation pattern in the WCDMA communication band while an operation frequency is in the WLAN communication band.

Referring to FIG. 4, it can be seen that, when the intelligent periodic structure is served in the WCDMA communication band, the antenna radiation pattern is similar to when the intelligent periodic structure is not employed.

As described above, the body protection apparatus of accordance with the embodiment not only may protect the body from electromagnetic fields by controlling the characteristics of the periodic structure according to the surrounding environment, but also selectively improve the characteristics at a different service band (operation frequency) using the radiation pattern improvement technology of the conventional periodic structure.

In accordance with the embodiments of the present invention, as the frequency-selective periodic structure is applied to a communication device, the body protection apparatus may control the radiation pattern according to the surrounding environment to reduce an absorption rate of electromagnetic fields which may be absorbed into the body, in the communication band. Furthermore, the body protection apparatus may improve the performance of the antenna using the periodic structure in a different service band such as WLAN. Therefore, the body protection apparatus may intelligently deal with the surrounding environment.

While the invention has been shown and described with respect to the preferred embodiments, it will be understood by those skilled in the art that various changes and modifications may be made without departing from the scope of the invention as defined in the following claims.

What is claimed is:

1. An apparatus for body protection from electromagnetic fields for use in a wireless communication terminal with an antenna, the apparatus comprising:
a sensing unit configured to sense a surrounding environment of the wireless communication terminal;
a variable element configured to perform a variable operation according to a voltage or current applied thereto;
a variable element control unit coupled with the sensing unit and coupled with the variable element, the variable element control unit configured to control the voltage or current according to the surrounding environment sensed by the sensing unit to cause the variable element to perform the variable operation; and
an intelligent periodic structure coupled with the variable element and coupled with the antenna, wherein the intelligent periodic structure is configured to change an operation frequency of the wireless communication terminal according to the variable operation of the variable element and adjust a radiation pattern direction of the antenna.

2. The apparatus of claim 1, wherein the variable element is disposed between unit cells of the intelligent periodic structure and inside the intelligent periodic structure.

3. The apparatus of claim 1, wherein the sensing unit senses whether or not the wireless communication terminal is in contact with the body, and
the variable element control unit controls the variable element to perform the variable operation according to whether or not the wireless communication device is in contact with the body.

4. The apparatus of claim 1, wherein the sensing unit senses whether or not the wireless communication device is in contact with the body, by sensing whether or not a near-field communication function of the wireless communication device is activated, whether or not a video call is activated or not, or whether the wireless Internet is used.

5. The apparatus of claim 1, wherein the sensing unit senses whether or not a call button is manipulated on the wireless communication device, and
when the call button is manipulated, the variable element control unit controls the variable element to perform a variable operation and changes the operation frequency of the wireless communication device.

6. The apparatus of claim 1, wherein the variable element control unit controls the variable element to perform a variable operation, and changes the operation frequency by controlling capacitance or inductance induced in the intelligent periodic structure.

7. The apparatus of claim 1, wherein the operation frequency is changed from a first frequency band operating at a WCDMA frequency to a second frequency band operating at a WLAN frequency.

8. A method for body protection from electromagnetic fields in a wireless communication terminal including a variable element performing a variable operation according to a voltage or current applied thereto and an intelligent periodic structure combined with the variable element, the method comprising:
sensing a surrounding environment of the wireless communication terminal;
controlling the variable element to perform the variable operation by controlling the voltage or current according to the sensed surrounding environment;
changing the operation frequency through the use of the intelligent periodic structure according to the variable operation; and
adjusting the radiation pattern direction of the antenna.

9. The method of claim 8, wherein said sensing of the surrounding environment comprises sensing the surrounding environment through whether or not a wireless communication terminal is in contact with the body or not, and
said controlling of the variable element to perform a variable operation comprises controlling the variable element to perform a variable operation when the wireless communication terminal is in contact with the body.

10. The method of claim 9, wherein said sensing of the surrounding environment comprises determining whether or not the wireless communication terminal is in contact with the body, through whether or not a near-field communication function in the wireless communication terminal is activated, whether or not a video call function is activated, or whether the wireless Internet is used.

11. The method of claim 8, wherein said sensing of the surrounding environment comprises sensing the surrounding environment through whether or not a call button on a wireless communication device is manipulated, and said controlling of the variable element to perform a variable operation comprises controlling the variable element to perform a variable operation when the call button is manipulated.

12. The method of claim 8, wherein the operation frequency is changed from a first frequency band operating at a WCDMA frequency to a second frequency band operating at a WLAN frequency.

13. The method of claim 8, wherein changing the operation frequency through the use of the intelligent periodic structure further comprises controlling capacitance or inductance induced in the intelligent periodic structure.

14. The method of claim 8, wherein the variable element is disposed between unit cells of the intelligent periodic structure.

* * * * *